United States Patent [19]
Tombetti

[11] Patent Number: 6,021,187
[45] Date of Patent: Feb. 1, 2000

[54] MULTIMEDIA PHONE SYSTEM

[75] Inventor: Stefano Tombetti, Cortina D'Amprezzo, Italy

[73] Assignee: Mobile Computing Systems, Burlingame, Calif.

[21] Appl. No.: 09/003,779

[22] Filed: Jan. 7, 1998

[51] Int. Cl.$^7$ ..................................................... H04M 1/00
[52] U.S. Cl. .................................. 379/110.01; 379/90.01; 379/92.04
[58] Field of Search .............................. 379/90.01, 92.04, 379/93.01, 93.09, 93.17, 93.23, 93.24, 93.29, 100.01, 102.02, 110.01, 428, 447

[56] References Cited

U.S. PATENT DOCUMENTS

| | | | |
|---|---|---|---|
| 5,331,509 | 7/1994 | Kikinis | 361/686 |
| 5,799,068 | 8/1998 | Kikinis et al. | 379/93.06 |
| 5,815,153 | 9/1998 | Isensee et al. | 345/354 |

Primary Examiner—Curtis A. Kuntz
Assistant Examiner—Melur Ramakrishnaiah
Attorney, Agent, or Firm—Sawyer & Associates

[57] ABSTRACT

A system and method for a telecommunications terminal system is disclosed. In one aspect, the method and system include providing a telecommunication device; and providing a back panel coupled to the telecommunication device. The back panel is for communicating with a plurality of devices and aiding in supporting the functions of each of the plurality of devices. Each of the plurality of devices is capable of being added to the system in a modular fashion. In another aspect, the method and system include providing a telecommunication device, a master unit coupled to the telecommunication device, and a slave unit. The master unit for communicating with a plurality of devices and aiding in supporting the functions of each of the plurality of devices, each of the plurality of devices capable of being added to the system in a modular fashion; and a slave unit coupled to the master unit for executing a plurality of applications.

30 Claims, 5 Drawing Sheets

MULTIMEDIA PHONE SYSTEM

FIELD OF THE INVENTION

The present invention relates to a method and system for telecommunications and computer services and more particularly to a method and system for providing a modular phone system having telecommunication and data processing capabilities.

BACKGROUND OF THE INVENTION

Currently, computers are used to perform a variety of tasks, including processing data and accessing a large amount of information or services from a remote location using conventional transmission media such as a telephone line. For example, an increasing number of individuals have internet access. Through the internet, users conduct business and obtain access to information in a variety of forms including audio and video. Similarly, other businesses provide a consumer with a direct connection to a particular business's server. This affords the consumer an opportunity to remote access services of the business.

In addition to processing data and accessing remote services, a computer is capable of supporting a variety of other devices. A computer can download information to or from another system which is directly coupled to the computer. Data from the other system can then be accessed and edited on the computer. For example, data from an external drive, personal digital assistant, or other device having storage capabilities can be transferred to the computer through a port on the computer.

Conventional telecommunications terminals send and receive audio signals. Such conventional telecommunications terminals also have a long useful life. Technology developed many years ago, such as rotary telecommunications terminals, can still be used to send and receive audio signals. Some telecommunications terminals are also capable of providing computing functions. For example, some telecommunications terminals allow a user to access certain online services. However, to use most of the data capabilities of conventional transmission media, an additional device is typically required. Therefore, a computer is frequently used to send or receive data over a telecommunications terminal line and carry out other complex processes.

Although conventional computer and phone systems function, these systems individually have drawbacks and are traditionally incompatible. As discussed above, the useful life of conventional telecommunications terminals should be relatively long. This long life is possible because the basic requirements for transmission of audio signals are relatively limited. Similarly, components which can interact with a conventional telecommunications terminal, such as a handset, are capable of interfacing with technology designed years before. In contrast, computers often have a very short life span and are rapidly replaced with incompatible new systems having faster, more powerful processors or greater memory. Moreover, components which can be coupled to computers change rapidly. Computers provide a wide variety of functions and can be adapted to support other devices, such as printers or modems. In comparison, telecommunications terminals are typically not adaptable to support new functions or devices. Finally, computers may be difficult for a user to comprehend, requiring experience and/or training to be useful. In contrast, conventional telecommunications terminals are simple, allowing most people to use a telecommunications terminal with little or no training.

The price of a computer is also a barrier to many individuals wishing to use computers. Partially as a result of this cost, there are relatively few computer systems purchased world wide. In contrast, telecommunications terminals are relatively low in cost and are present to a much greater degree throughout the world. Telecommunications terminals also have an additional drawback. State of the art transmission media often have very different requirements for communication than do traditional communication media. For example, some newer phone lines, such as ISDN lines, carry digital signals. Other conventional phone lines only carry analog signals. Conventional telecommunications terminals may be incapable of using one or the other of the transmission media discussed above.

Accordingly, what is needed is a system and method for a providing the benefits of traditional telecommunications terminals, such as a long life span, and the advantages of a computer, such as communication with a variety of other devices and data processing capabilities. The present invention addresses such a need.

SUMMARY OF THE INVENTION

The present invention provides a method and system for providing a variety of multimedia services. In one aspect, the method and system comprise providing a telecommunication device; and providing a back panel coupled to the telecommunication device. The back panel is for communicating with a plurality of devices and aiding in supporting the functions of each of the plurality of devices. Each of the plurality of devices is capable of being added to the system in a modular fashion. In another aspect, the method and system comprise providing a telecommunication device, a master unit coupled to the telecommunication device, and a slave unit. The master unit for communicating with a plurality of devices and aiding in supporting the functions of each of the plurality of devices, each of the plurality of devices capable of being added to the system in a modular fashion; and a slave unit coupled to the master unit for executing a plurality of applications.

According to the system and method disclosed herein, the present invention allows a telecommunications terminal to provide a number of additional functions simply and in a modular fashion, thereby increasing overall system performance.

DETAILED DESCRIPTION OF THE INVENTION

The present invention relates to an improvement in telecommunications systems. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Currently, the major technologies for exchanging information include telecommunication devices, such as telecommunications terminals, and computers. Conventional telecommunications terminals send and receive audio signals. Such conventional telecommunications terminals also have a long useful life. Technology developed many years ago, such as rotary telecommunications terminals, can still be used to send and receive audio signals.

Figure 1:
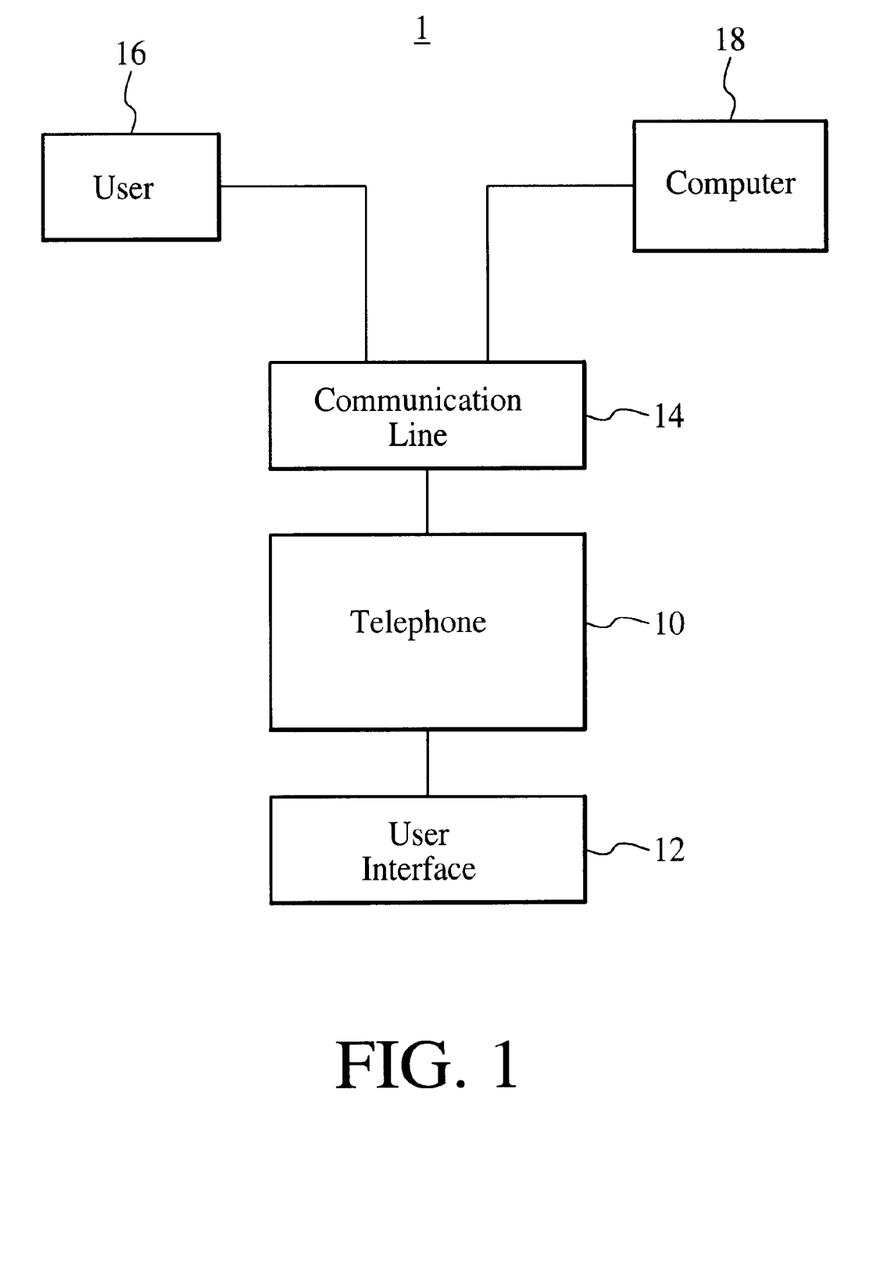
FIG. 1 is block diagram of a conventional phone system.

Some telecommunications terminals are also capable of providing limited computing functions. FIG. 1 depicts a block diagram of a telecommunications system 1 including such a conventional telecommunications terminal 10. The conventional telecommunications terminal includes a user interface 12. The user interface may include a handset and keypad. The telecommunications terminal 10 is coupled to the communication line 14. Through the communication line 14, the conventional telecommunications terminal can be used to send audio signals to and receive audio signals from the user 16. In addition, the telecommunications terminal 10 can communicate with the computer 18. For example, the telecommunications terminal 10 may allow a user to access certain online services. However, the functionality of the telecommunications terminal 10 is severely limited. Therefore, a computer is frequently used to send or receive data over a telecommunications terminal line and carry out other complex processes.

A separate computer (not shown) can be used to perform a variety of other tasks, including processing data and accessing a large amount of information or services from a remote location using conventional transmission media such as a telecommunications terminal line. In addition to processing data and accessing remote services, a computer is capable of supporting a variety of other devices. A computer can download information to or from another system which is directly coupled to the computer for editing on the computer. For example, data from a personal digital assistant or other device can be transferred to the computer through a port on the computer. Thus, through the use of a computer (not shown) and the telecommunications terminal 10, a user can perform many different tasks.

Although conventional computers and phone systems function separately, those with ordinary skill in the art will realize that each of these systems has drawbacks. For example, a computer is relatively expensive and may be difficult to use for an unsophisticated user. Although inexpensive, a telecommunications terminal has limited functionality and typically cannot support peripherals not provided with the system. In addition, state of the art transmission media often have very different requirements for communication than do traditional communication media. For example, some newer phone lines, such as ISDN lines, carry digital signals. Other conventional phone lines only carry analog signals. Conventional telecommunications terminals may be incapable of using one or the other of the transmission media discussed above.

Moreover, it is difficult to provide the functions of both telecommunications terminal and computer systems in a single device. The life span of conventional telecommunications terminals should be relatively long, in part because the hardware required to provide basic functions, such as audio communication, is simple. Similarly, components which can interact with a conventional telecommunications terminal, such as a handset, are capable of interfacing with technology designed years before. In contrast, computers often have a very short life span and are rapidly replaced with new systems having faster, more powerful processors or greater memory. In addition, the specifications for components which interface with computers change rapidly. Finally, computers may be difficult for a user to understand and may require experience and/or training prior to used. In contrast, conventional telecommunications terminals are simple, allowing most people to use a telecommunications terminal with little or no training.

The present invention provides for a method and system for providing a telecommunications terminal which, in its most basic form, is relatively low cost but can be expanded to provide new functions similar to those found in a computer and support new devices in a modular manner. The present invention will be described in terms of a multimedia phone system using high performance portable environment ("HOPE!") based software. HOPE! based software allows a user to create an application in a conventional environment, transfer the application to an environment having limited memory without making substantial changes to the application, and run the application in the environment having limited memory. For example, HOPE! based software has been used to provide software for portable personal digital assistants, to allow transportation of conventional database applications to portable personal digital assistants. However, one of ordinary skill in the art will readily recognize that this method and system will operate effectively for other types of phone systems and other software technology.

The method and system provide a modular multimedia phone system. The basic unit provides conventional telecommunications terminal services in addition to certain other services chosen by the user, such as electronic mail, internet access, and access to compatible servers. Hardware and software can be added to the basic unit in a modular fashion. As a result, the user can easily upgrade the system to provide a variety of other functions such as video conferencing, utilizing a larger monitor, or a secure method of payment for online purchases. At the same time, the basic unit can be made relatively inexpensive.

Figure 2:
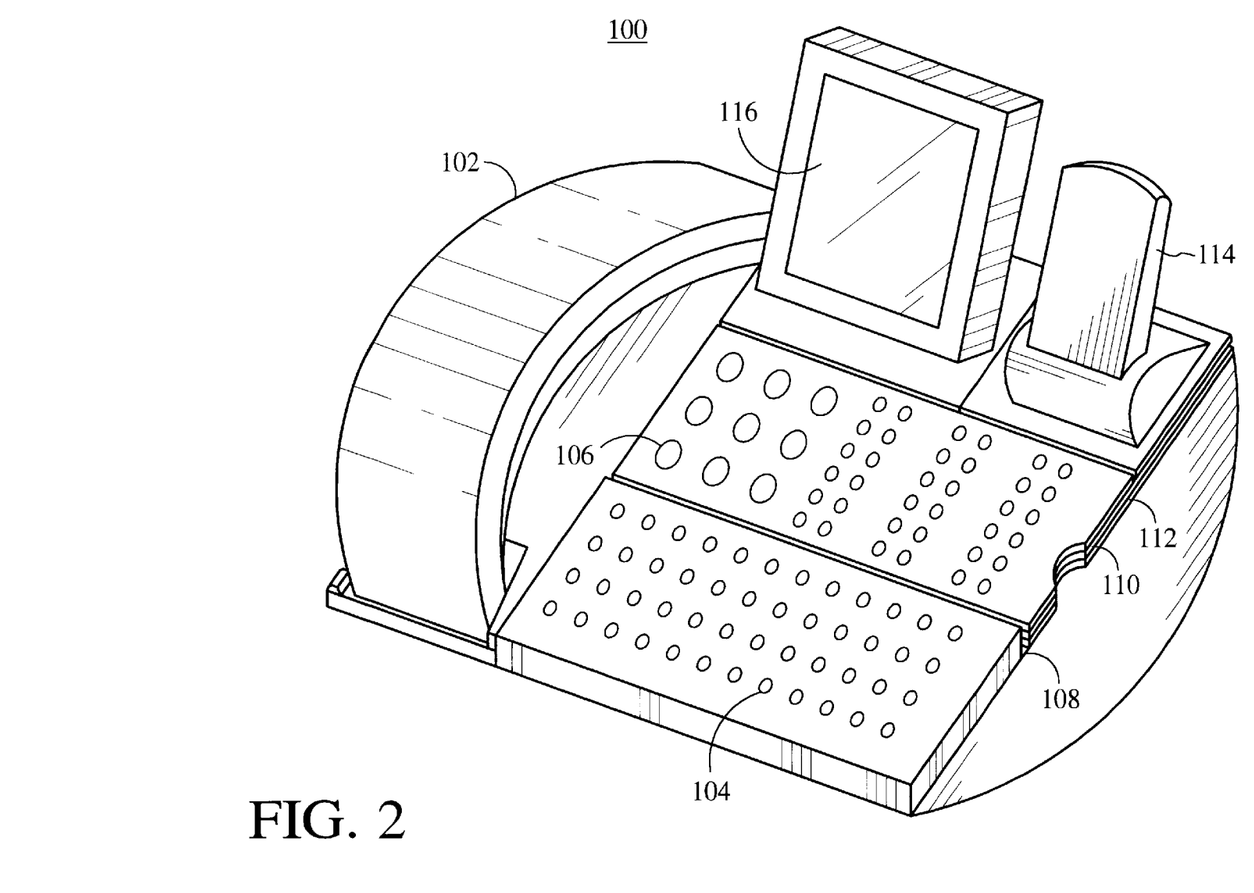
FIG. 2 is a perspective view of the top and right side of one embodiment of a multimedia phone in accordance with the method and system.

To more particularly illustrate the method and system in accordance with the present invention, refer now to FIG. 2 depicting a perspective view of the top and right side of one embodiment of a multimedia phone 100 in accordance with the method and system. The system 100 includes a telecommunications terminal 102. The telecommunications terminal 102 can be corded or cordless. The system 100 also includes a two keyboards 104 and 106, a credit card slot 108, a SMARTCARD slot 110, a PCM slot 112, a pager 114, and an LCD display 116. Note that most of these features, such as the pager 114, are optional in a base unit. Thus, in its most basic form, the system 100 may include only the base unit having the telecommunications terminal 102, the keyboards 104 and 106, the credit card slot 108, and the SMARTCARD slot 110.

A portion of the keyboard 106 is used for dialing telecommunications terminal numbers when the system 100 is used as a conventional telecommunications terminal. The keyboards 104 and 106 can also be used to enter data into the system, in a similar manner as a keyboard of a conventional computer. For example, the system 100 may be provided with FAX or email capabilities. In such an embodiment, the keyboards 104 or 106 can be used for entering an email or FAX message.

The LCD screen 116 can function as an LCD screen in conventional phones, for example displaying the telecommunications terminal number dialed. A single line display, not shown, can also be used to display telecommunications terminal numbers or other information. The LCD screen 116 also displays data retrieved or entered when using the multimedia capabilities of the system 100. For example, email messages being retrieved or composed can be displayed on the LCD screen 116. Consistent with the modular nature of the system 100, the LCD screen 116 can be replaced with a larger LCD screen, not shown.

The system 100 can even be coupled to use a television, not shown. In such a case, the television is used as a monitor in lieu of the LCD screen 116. Similarly, a video camera, not shown, can also be coupled to the system 100. Using the video camera, video conferencing capabilities of the system 100 can be exploited. Moreover, in one embodiment, the system 100 could also be connected to a personal digital assistant, not shown. The personal digital assistant might take the place of the LCD screen 116. In such an embodiment, data from the personal digital assistant could be downloaded to the system 100 for display and editing. These and other modules are capable of being supported by the system 100.

The system 100 also contains a pager 114. While attached, the pager 114 can be recharged. Any attempts to access the system 100, for example a telecommunications terminal call, can be forwarded to the pager 114. Although not shown, a docking port for a cellular phone could also be provided. Such a docking port could take the place of the pager 114. In one embodiment, the pager 114 and other peripherals are optional modules that may be added by a user. Similarly, a central processing unit (processing module), not shown, can be upgraded when additional power is needed for added applications.

The system 100 also contains a credit card slot 108, a SMARTCARD slot 110 and a PC-MCIA card slot 100. The credit card and SMARTCARD slots 108 and 110, respectively allow a user to pay for purchases made online. Use of the SMARTCARD slot 110 provides a consumer with added protection because purchases can only be made when the SMARTCARD, a prepaid credit card, is located in the SMARTCARD slot 110. Added security is also provided when a user directly accesses compatible online services provided directly by a business.

In its most basic and inexpensive form, the system 100 can provide basic telecommunications terminal services. Moreover, phone service using both conventional telecommunications terminal lines and digital lines can be provided. Other modules can easily be added to the system 100. Thus, when the system 100 is provided with other modules, a user can send and retrieve email, send and receive a FAX, access the internet, access compatible services, for example online banking services, as well as perform a variety of other tasks typically performed by a computer. In addition, the user can easily add software applications or hardware modules, such as the video camera, pager, or cellular phone discussed above. Functions or modules can be added without requiring technical expertise by the user because of the modular nature of the hardware and the unique architecture of the system 100.

The system 100 can provide the variety of functions in a modular environment because of the unique architecture utilized. In order to provide the functions and peripherals in a modular format, hardware and software must be structured appropriately.

Figure 3:
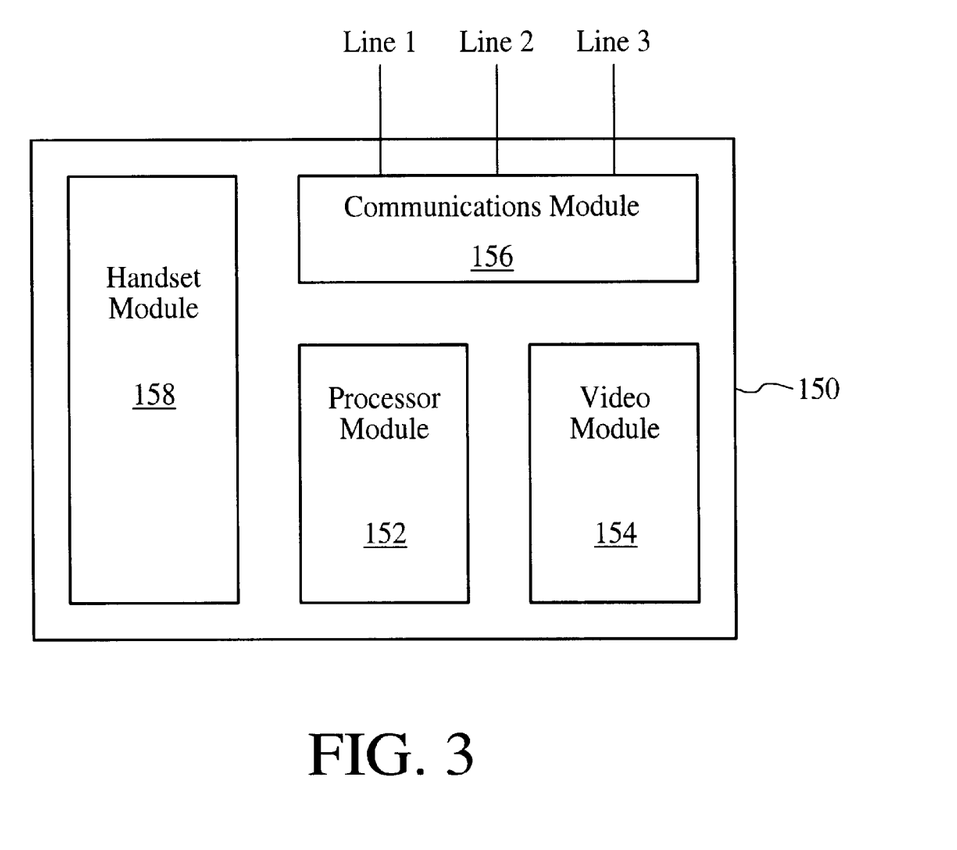
FIG. 3 is a block diagram of one embodiment of the hardware capable of being used in the multimedia phone in accordance with the method and system.

Refer now to FIG. 3, depicting one embodiment of the hardware capable of being used in the multimedia phone in accordance with the method and system. The basic hardware unit is the mother module 150, hereinafter referred to as a back panel 150. In a preferred embodiment, all versions of the system 100 have a back panel 150.

In contrast to conventional computer systems which are architected with a central processing unit as a master and other devices as a slave, the system 100 is architected with the back panel 150 as the master. The processing module, not shown, on the processing module 152 is a slave. Thus, the processing module 152 requires communication with the back panel 150 to interface with other portions of the system 100 and perform the functions required of the processing module. Other components of the system 100 also are accessed and communicate through the back panel 150.

The back panel 150 can support all of the functions for all of the hardware that the system 100 is capable of providing. For example, the SMARTCARD slot 110 and credit card slot 108 are coupled to the back panel 150. The back panel 150 is capable of reading a SMARTCARD or credit card used in the corresponding slots 110 and 108. However, in a preferred embodiment, to ensure that the system 100 can adapt to changes in encoding of SMARTCARDs, credit cards, and other devices, the decoding of information read from by the back panel 150 is performed by the processing module. Similarly, all displays, including LCD screen 116 or the video screen or VGA monitor that can replace the LCD screen 116, are coupled through the back panel 150.

The back panel 150 also automatically reconfigures itself in response to the addition of a new hardware or software module. For example, if a user purchases a cellular phone docking station, not shown, after initial purchase of the system 100. The user then couples the docking station to the system 100. The back panel 150 can detect the presence of the docking station and reconfigure the back panel 150 to support the docking station. Similarly, a user can purchase a docking station which may be fitted where the LCD 116 attaches to the system 100. This docking station may have some intelligence, for example to provide an interface to a personal digital assistant, not shown. The back panel 150 can detect the presence of the docking station and reconfigure the back panel 150 to support the docking station. The personal digital assistant can then be attached to the system 100 and the contents of the personal digital assistant can be downloaded to the system 100. Similarly, the back panel 150 automatically reconfigures itself when new modules, such as a new handset, a pager, or new display screen, are added to the system. This feature allows the system 100 to support new modules without requiring significant technical knowledge on the part of the user.

Because of the unique architecture discussed above, the processing module 152 is a daughter module while the back panel 150 is the mother module. Consequently, the system 100 can be provided without the processing module 152. When present, the processing on the processing module relies on the back panel 150 for actual communication with other portions of the system 100, while the processing implements software applications. As a result, the processing module 152 can be replaced with another processing module 152 which has a different processor, a different operating system, or other features which vary widely from the original processing module 152. Similarly, changes in encoding methods or operating systems of the devices coupled to system 100, such as a change in the encoding scheme for SMARTCARDs, can be accounted for by changing the processing module 152 rather than changing the back panel 150 or abandoning the system 100. Thus, the system 100 is capable of adapting to advances in technology, including new hardware or new software, which enhance the performance of the system 100.

In a preferred embodiment, the system 100 can also be provided with three other daughter modules 154, 156, and 158. These daughter modules 154, 156, and 158 provide other functions of the system 100. The system 100 can be provided with any combination of some or all of the daughter modules 152, 154, 156, and 158 in addition to the back panel 150.

In one embodiment, a second daughter module 154 is a video module 154. The video module 154 controls the display. Thus, when a new variety of display is to be supported, the video module 154 can be replaced if necessary. In one embodiment, a third daughter module 156 is a communications module 156. In one embodiment, the communications module 156 supports three lines. The three lines can be any combination of analog and digital lines. Moreover, the communications module 156 can be replaced to support different types of networks or different transmission media. In one embodiment, a fourth daughter module 158 is a handset module 158. The handset module 158 is capable of supporting a variety of different handsets, including no handset (speaker phone). Thus, a user can purchase the system 100 with a corded handset, later purchase a cordless handset and, if required, replace the handset module 158 to support the new handset.

In addition to supporting hardware modules, the architecture of the system 100 allows new software applications to be provided for the system 100. A device manager is a software application that resides in the back panel 150 and provides support for each function of the system 100. The device manager allows the system to support basic functions of the system 100, such as telecommunications terminal functions, but also allows the integration of new hardware modules and software applications.

Figure 4:
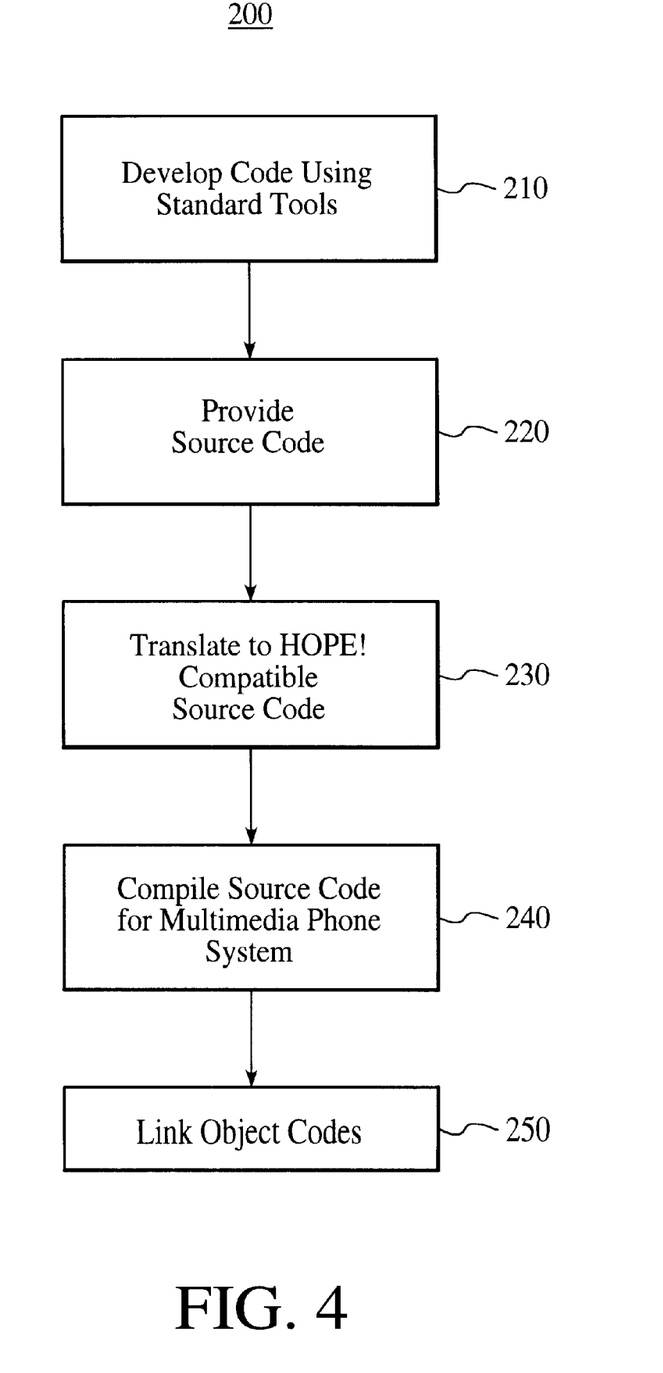
FIG. 4 is a flow chart depicting one embodiment of how a new software application is incorporated into a multimedia phone.

Refer now to FIG. 4 depicting one embodiment of a method 200 for developing an application for use on the multimedia phone system 100. In a preferred embodiment, HOPE! based software is used for the system 100. HOPE! based software is used to allow a developer to develop the application in a standard environment and import the application to an environment having limited memory. Moreover, a HOPE! application can be run not only in the environment having limited memory, but also on a conventional environment using a standard operating system. For example, a HOPE! application is capable of running both on a system such as a personal digital assistant and a MICROSOFT WINDOWS environment.

The source code for the application developed in MICROSOFT VISUAL BASIC or other standard environment is provided via steps 210 and 220. The source code is then translated using a HOPE! translator in step 230. In a preferred embodiment, the translated source code is C source code. The translated source code is then compiled in a manner appropriate to the multimedia phone system 100 via step 240. Thus, the object code for the multimedia phone system 100 is provided. The object code is then linked to predefined objects in the HOPE! software environment via step 250. The application is then executable on the multimedia phone system 100. Thus, an application can be developed in a standard environment and run on the system 100.

Figure 5:
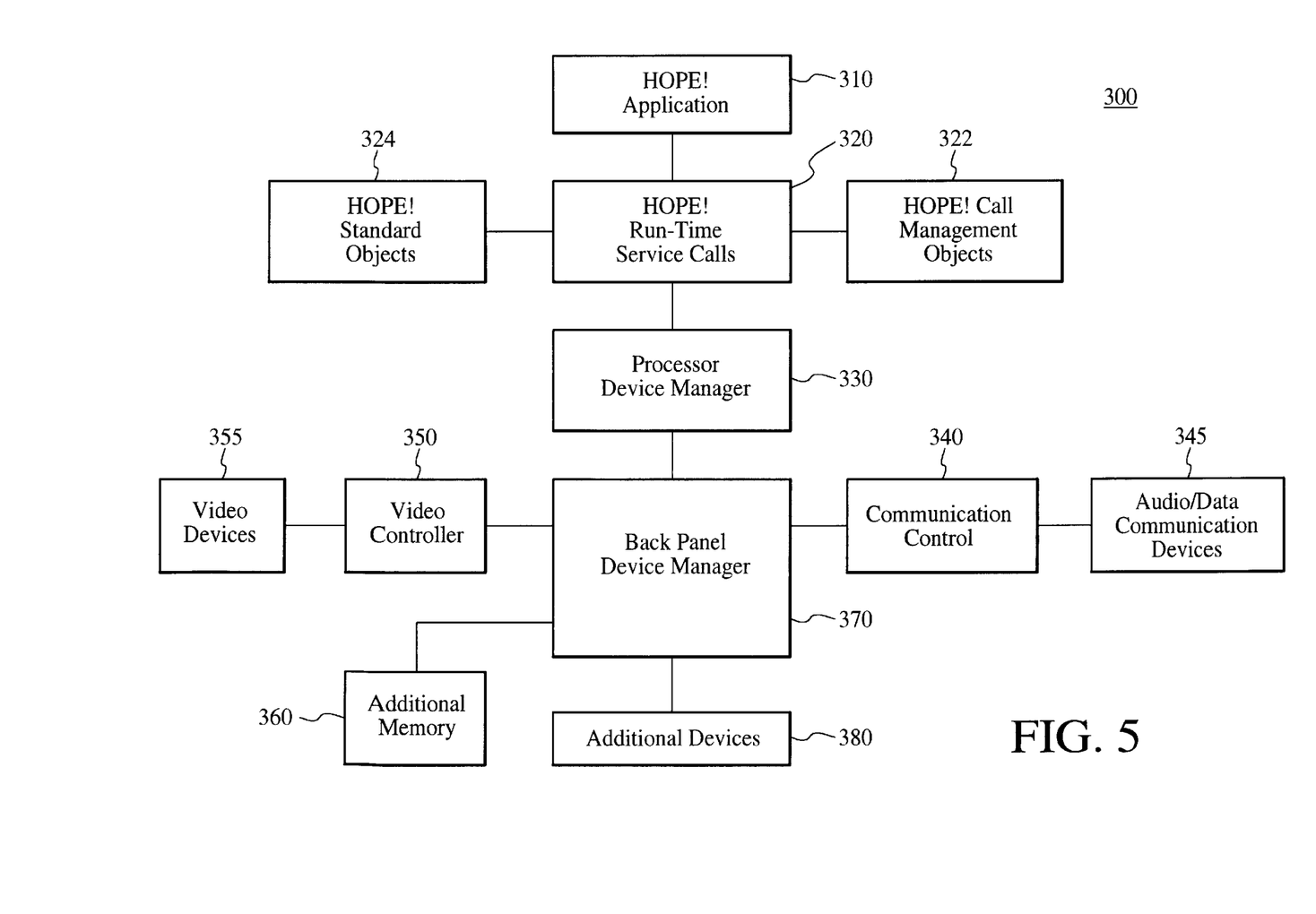
FIG. 5 is a block diagram of one embodiment of the interaction between software and hardware in a multimedia phone.

Through the method 200 additional software applications can be provided. Refer now to FIG. 5 depicting one embodiment 300 of the interaction between a software application developed for use on the system 100 and remainder of the system 100. The application 310 is run on the system 100. Most applications 310 reside in memory on the processing module 152. However, nothing prevents the inclusion of memory to hold the application 310 in another location.

The processing on the processing module 152 executes the application 310. To execute the commands in the application 310, HOPE! run-time service calls 320 may be accessed. The run-time service calls 320 are system calls to previously compiled support objects. These run-time service calls 320 are, therefore, similar to system calls to a library. In one embodiment, the support objects are HOPE! standard objects 324 and HOPE! call management objects 322. The run-time service calls 320 also access the processing module device manager 330. The processing module device manager 330, which resides on the processing module 152, communicates with the back panel device manager 370. The back panel device manager 370 provides communication to the other daughter modules which control the video devices 355, such as the LCD screen 116, and the communication to the communication devices 345. In order to do so, the back panel device manager 370 communicates to a communication controller 340 and a video controller 350 on the communication module 156 and video module 154, respectively.

In a preferred embodiment, the system 100 also includes additional memory 360. In one embodiment, the additional memory 360 is a FLASH pc card or a RAM pc card which can be accessed using the PC-MCIA slot, not shown. Consequently, the additional memory is accessed through the back panel 150 and, therefore, the back panel device manager 370.

In the preferred embodiment, additional devices such as those discussed above are also controlled by the back panel device manager 370. Because the back panel 150 controls the additional devices 380, the processing module, not shown, can also perform other tasks while the additional devices 380 are accessed by the separate processing unit. The additional devices 380 include but are not limited to the keypad 106, a reader in the SMARTCARD slot 110, a reader in credit card slot 108, and the pager 114. Because the back panel device manager 370 controls the interaction of the processing module with other portions of the system 100, the processing module 152 can be replaced and the processing to module or memory updated.

As discussed previously, the system 100 need not be purchased with all of the available additional devices 380. The back panel 150 is capable of controlling additional hardware that is purchased and added to the system 100 later. The back panel 150 also reconfigures itself to account for the additional hardware. Thus, the system 100 is modular and additional hardware devices can be easily added by a user. In addition, as discussed with respect to FIG. 4, software applications can be easily developed in conventional environments for use in the system 100. Because the back panel 150 controls all communications to the additional devices 380 as well as the modules 152, 154, and 156, software applications can control the additional devices. The system 100 has this ability even if the software is developed in a foreign environment and run on a processing module not currently in existence. In other words, the master-slave relationship of the back panel 150 and processing module 152, respectively, allow a new operating system or PROCESSING MODULE to be provided while supporting the functions of the additional devices 380 and other daughter modules 154, 156, and 158.

A method and system has been disclosed for providing a multimedia phone system that can provide a variety of services. The multimedia phone system is also modular in nature. Additional hardware device can be added as modules to the multimedia phone system. Consequently, the basic unit is easily upgradable by a user having little or no technical experience. Although the present invention has been described with reference to particular services, such as online banking, internet access, and email, nothing prevents the method and system from use with other services.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A telecommunication system comprising:
    a base unit including a telecommunication device and a back panel;
    the telecommunication device being capable of providing voice communication; and
    the back panel being coupled to the telecommunication device, the back panel for allowing the telecommunication system to provide a plurality of multimedia services, for communicating with a plurality of devices and for aiding in supporting the functions of each of the plurality of devices, the back panel further automatically reconfiguring itself with the addition of a new device of a plurality of devices, each of the plurality of devices capable of being added to the telecommunication system in a modular fashion.

2. The system of claim 1 wherein the back panel further includes a device manager for supporting the plurality of devices and allowing for the addition of the new device of the plurality of devices.

3. The system of claim 2 further comprising at least one daughter module coupled to the back panel, the at least one daughter module for providing a plurality of functions.

4. The system of claim 3 wherein the at least one daughter module further includes a central processing unit module for running a plurality of applications.

5. The system of claim 4 wherein the plurality of applications further include an application for controlling one of the plurality of devices.

6. The system of claim 5 wherein the plurality of applications further includes an object oriented program.

7. The system of claim 3 wherein the at least one daughter module further includes a communications module for controlling communication to a remote location.

8. The system of claim 7 wherein the at least one daughter module further includes a processing module.

9. The system of claim 3 wherein the at least one daughter module further includes a video module for controlling a display, the display for graphically displaying data to a user.

10. The system of claim 9 wherein the at least one daughter module further includes a processing module.

11. The system of claim 10 wherein the at least one daughter module further includes a handset module for controlling a handset, the handset for providing and receiving audio signals.

12. A telecommunication system comprising:
    a base unit including a telecommunication device, a master unit, and a slave unit;
    the telecommunication device being capable of providing voice communication;
    the master unit being coupled to the telecommunication device, the master unit for communicating with a plurality of devices, allowing the telecommunication system to provide a plurality of multimedia services, and aiding in supporting the functions of each of the plurality of devices, the master unit further automatically reconfiguring itself with the addition of a new device of the plurality of devices, each of the plurality of devices capable of being added to the telecommunication system in a modular fashion; and
    the slave unit being coupled to the master unit, the slave unit for executing a plurality of applications.

13. The system of claim 12 wherein the slave unit is a central processing unit.

14. The system of claim 12 wherein the master unit further includes a device manager for supporting the plurality of devices and allowing for the addition of the new device of the plurality of devices.

15. The system of claim 14 further comprising at least one daughter module coupled to the master unit, the at least one daughter module for providing a plurality of functions.

16. A method for providing a telecommunication system comprising the steps of:
    providing a base unit;
    providing a telecommunication device in the base unit, the telecommunication device being capable of providing voice communication; and
    providing a back panel in the base unit, the back panel being coupled to the telecommunication device, the back panel for communicating with a plurality of devices, for allowing the telecommunication system to provide a plurality of multimedia service, and aiding in supporting the functions of each of the plurality of devices, the back panel further automatically reconfiguring itself with the addition of a new device of the plurality of devices, each of the plurality of devices capable of being added to the telecommunication system in a modular fashion.

17. The method of claim 16 wherein the back panel further includes a device manager for supporting the plurality of devices and allowing for the addition of the new device of the plurality of devices.

18. The method of claim 17 further comprising at least one daughter module coupled to the back panel, the at least one daughter module for providing a plurality of functions.

19. The method of claim 18 wherein the at least one daughter module further includes a central processing unit module for running a plurality of applications.

20. The method of claim 19 wherein the plurality of applications further include an application for controlling one of the plurality of devices.

21. The method of claim 20 wherein the plurality of applications further includes an object oriented program.

22. The method of claim 18 wherein the at least one daughter module further includes a communications module for controlling communication to a remote location.

23. The method of claim 22 wherein the at least one daughter module further includes a processing module.

24. The method of claim 18 wherein the at least one daughter module further includes a video module for controlling a display, the display for graphically displaying data to a user.

25. The method of claim 24 wherein the at least one daughter module further includes a processing module.

26. The method of claim 25 wherein the at least one daughter module further includes a handset module for controlling a handset, the handset for providing and receiving audio signals.

27. A method for providing a telecommunication system comprising the steps of:

provided a base unit;

providing a telecommunication device in the base unit, the telecommunication device being capable of providing voice communication;

providing a master unit in the base unit, the master unit being coupled to the telecommunication device, the master unit for communicating with a plurality of devices, allowing the telecommnunication system to provide a plurality of multimedia services, and aiding in supporting the functions of each of the plurality of devices, the master unit automatically reconfiguring itself with the addition of a new device of the plurality of devices, each of the plurality of devices capable of being added to the telecommunication system in a modular fashion; and providing a slave unit in the base unit and coupled to the master unit, the slave unit for executing a plurality of applications.

28. The method of claim 27 wherein the slave unit is a central processing unit.

29. The method of claim 28 wherein the master unit further includes a device manager for supporting the plurality of devices and allowing for the addition of the new device of the plurality of devices.

30. The method of claim 29 further comprising the step of:

providing at least one daughter module coupled to the master unit, the at least one daughter module for providing a plurality of functions.

\* \* \* \* \*